(12) United States Patent
Sin Xicola et al.

(10) Patent No.: US 12,036,696 B2
(45) Date of Patent: Jul. 16, 2024

(54) METHOD FOR THE PREPARATION OF FRICTION MATERIAL, SPECIFICALLY FOR THE MANUFACTURE OF BRAKE PADS AND ASSOCIATED BRAKE PADS

(71) Applicant: ITT Italia S.R.L., Milan (IT)

(72) Inventors: Agustin Sin Xicola, Barge (IT); Francesco Vannucci, Milan (IT); Paolo Colombo, Barge (IT); Alberto Conte, Barge (IT)

(*) Notice: Subject to any disclaimer, the term of this patent is extended or adjusted under 35 U.S.C. 154(b) by 632 days.

(21) Appl. No.: 17/270,250

(22) PCT Filed: Aug. 23, 2019

(86) PCT No.: PCT/IB2019/057109
§ 371 (c)(1),
(2) Date: Feb. 22, 2021

(87) PCT Pub. No.: WO2020/039396
PCT Pub. Date: Feb. 27, 2020

(65) Prior Publication Data
US 2021/0323192 A1  Oct. 21, 2021

(30) Foreign Application Priority Data

Aug. 24, 2018 (IT) ........................ 102018000008182

(51) Int. Cl.
*B28B 1/54* (2006.01)
*C04B 12/00* (2006.01)
(Continued)

(52) U.S. Cl.
CPC .............. *B28B 1/54* (2013.01); *C04B 12/005* (2013.01); *C04B 14/106* (2013.01); *C04B 18/08* (2013.01);
(Continued)

(58) Field of Classification Search
CPC ....... B28B 1/54; C04B 14/106; C04B 28/006; C04B 12/005; C04B 18/08; C04B 12/04;
(Continued)

(56) References Cited

U.S. PATENT DOCUMENTS

| 2017/0016500 A1* | 1/2017 | Sin Xicola ............ F16D 69/028 |
| 2018/0231087 A1 | 8/2018 | Alfani et al. |

FOREIGN PATENT DOCUMENTS

| EP | 3128201 A2 | 2/2017 |
| GB | 2357517 A | 6/2001 |

OTHER PUBLICATIONS

International Search Report and Written Opinion for International Application No. PCT/IB2019/057109 mailed on Nov. 26, 2019, pp. 20.

* cited by examiner

*Primary Examiner* — Monica A Huson
(74) *Attorney, Agent, or Firm* — Turk IP Law, LLC

(57) ABSTRACT

Method for creating a brake pad with a block of friction material, in which sodium hydroxide and sodium silicate are dissolved in water, the aqueous solution of sodium hydroxide and sodium silicate is mixed with commercial metakaolin until a wet paste is obtained, the wet paste is formed and dried until a dried geopolymeric aggregate is obtained, the aggregate is ground to a powder, the dried ground aggregate is used as an exclusive or almost-exclusive inorganic geopolymeric binder in a friction material compound and the raw compound is hot-molded under a pressure greater than a water saturation pressure at the molding temperature.

14 Claims, 6 Drawing Sheets

(51) Int. Cl.
*C04B 14/10* (2006.01)
*C04B 18/08* (2006.01)
*F16D 69/02* (2006.01)
*C04B 14/48* (2006.01)

(52) U.S. Cl.
CPC ............ F16D 69/028 (2013.01); *C04B 14/48* (2013.01); *F16D 2200/0034* (2013.01); *F16D 2200/006* (2013.01); *F16D 2200/0095* (2013.01)

(58) Field of Classification Search
CPC .................. C04B 14/48; C04B 22/062; C04B 2103/0043; C04B 2111/00362; F16D 69/028; F16D 2200/0095; F16D 2200/0034; F16D 2200/0043; F16D 2200/006; Y02P 40/10; Y02W 30/91
See application file for complete search history.

METHOD FOR THE PREPARATION OF FRICTION MATERIAL, SPECIFICALLY FOR THE MANUFACTURE OF BRAKE PADS AND ASSOCIATED BRAKE PADS

CROSS-REFERENCE TO RELATED APPLICATIONS

The present application is a U.S. National Stage filing under 35 U.S.C. § 371 of International Application PCT/IB2019/057109, filed Aug. 23, 2019, which claims priority from Italian Patent Application No. 102018000008182 filed on Aug. 24, 2018, the entire disclosure of which is incorporated herein by reference.

Technical Invention Sector

This invention is a method for the preparation of a friction material, specifically for the manufacture of brake pads. The invention is also for an associated brake pad. The friction material of the invention is specifically intended for the manufacture of friction layers/blocks for friction elements such as braking elements, i.e. vehicle brake pads or blocks, and/or friction discs, non-asbestos, with performance similar to or better than those belonging to the NAO ("Non-Asbestos Organic friction material"), "Low Steel" and "Semi-met" classes of friction materials.

Technical Note

From European patent application no. 3128201 in the name of the same Applicant, whose content is incorporated herein when necessary for reference only, there is a prior process for obtaining a binder for brake pads, constituted at least 90% by a geopolymer, as well as a friction material and associated brake pads.

The second EP3128201 process foresees the production of binder through a process of dry grinding caustic soda flakes, with subsequent dry mixing of the soda powder with kaolin. This procedure, though being chemically efficient, requires a not-insignificant series of potential safety risks to operators.

The dry grinding of caustic soda is a high-risk process, as it produces very fine and volatile sodium hydroxide powders, highly caustic and irritating, which could be inhaled by operators when the grinder is opened to unload the product, for example, or during cleaning of the machine.

Dry grinding has another disadvantage: during grinding (performed in air) and during opening of the grinder and unloading of product, soda powders can absorb a significant quantity of moisture from the environment (soda is extremely hygroscopic, and this property is heightened in powdered product with high surface area).

This residual moisture is retained by the soda in subsequent mixes with kaolin and with other fillers added to the friction material compound, and is released in the form of a vapor during the hot molding of brake pads, leading to severe production problems with the layers/blocks of finished friction material, which tend to flake and crack.

Other known processes that involve the use of geopolymers do not resolve these problems.

For example, Lee et al/SAE Int. J. Passeng. Cars—Mech. Syst./Volume 6, Issue 3 (November 2013) examines possible eco-compatible friction materials in which organic fibers and/or copper or copper-based alloys are replaced with natural fibers, such as hemp, and in which part of the usual phenolic resin-based organic binder is replaced with a geopolymeric binder.

WO2014081277A1 provides a possible composition of a geopolymer composite based on volcanic ash to be used in mixes of friction materials intended for the production of brake pads, but provides no data, example, or method of preparation either for the geopolymer or for mixes of friction materials using such geopolymer.

Lee et al/WEAR, Vol. 302, no. 1-2, Jan. 9, 2013, pages 1404-1413 summarizes the same study published previously in SAE Int. J. Passeng. Cars indicated above, specifying that the geopolymer (whose preparation method is not at all described) is only a minor part (approximately ⅓) of the binder used in the tested brake pads, in which the rest of the binder is a traditional phenol-based organic binder.

U.S. Pat. No. 7,208,432, finally, teaches an inorganic composition of friction material for braking elements in which the binder is constituted by a glass or ceramic matrix, materials which are completely different from geopolymers and do not have characteristics in common with them, apart from also being inorganic compounds, which also involve very high processing temperatures incompatible with the current processes for obtaining brake pads.

SUMMARY OF THE INVENTION

The purpose of this invention is therefore to provide a method for the manufacture of friction layers/blocks for friction elements such as braking elements, e.g., vehicle brake pads or blocks and to prepare the related friction material and a respective inorganic binder which are free of the problems described above in process EP3128201, and which facilitate the obtaining of friction materials and associated brake pads resistant to the heat generated during braking, simultaneously providing braking performance and optimal tribological characteristics.

The invention is therefore a method to create friction layers/blocks for friction elements such as braking elements, e.g. vehicle brake pads or blocks, as defined in the attached claims.

The invention is also of an associated binder and a friction element, particularly brake pads or blocks, presenting a friction layer or block produced with the method of the invention.

A different type of geopolymeric type of binder was developed to deal with the problems described above. This process works with metakaolin instead of kaolin, and with an aqueous sodium silicate solution with a minimum of sodium hydroxide, which can in any case be used as a reactant. In general, other sources of aluminum silicates can be used in addition to metakaolin, such as kaolin or fly ash. However, kaolin has long reaction times, while one negative aspect of fly ash is the fact that suppliers do not provide unvarying composition over time. This is why metakaolin will be referred to henceforth, even though the other raw materials described above, i.e., a generic source of silica, such as quartz, or colloidal silica dissolved in a basic sodium or potassium hydroxide solution, under suitable conditions are part of the invention in any case.

Similarly, in addition to the sodium silicate and sodium hydroxide system, the potassium hydroxide and potassium silicate system can be used and is also part of the invention; similarly, other alkaline metals on which geopolymers can be developed, i.e., lithium, cesium, and rubidium, are also included in this invention, to be used as an alternative or in combination with sodium and/or potassium. But for the sake of simplicity, the sodium-based system will be referred to hereinafter.

Wet mortar, produced by adding the above-mentioned solution to metakaolin, is mechanically mixed and subsequently dried through an atmospheric pressure drying process, which can be conditioned until vacuum state is achieved (i.e., values equal to or greater than 0.018 mBar), with temperatures from 200 to 300° C. In this particular case, drying is done by atmospheric pressure at a temperature from 80° to 200° C. Drying may also be done in any case using other possible techniques, temperatures, and pressures for all stages of drying, including lyophilization.

Thus a dried product is obtained, with a loss of 5% to 40% from the original weight, related to the controlled residual moisture less than 30% in final weight. This product is then ground until sizes less than or equal to 800 microns are achieved, preferably less than 400 microns. This value is preferred, as it provides the best performance. This last value was selected for the comparative tests performed in the implementation examples provided below, and the final dried and ground product was used as a powdered binder for the production of compounds for brake pads similar to what happened in the original EP3128201 process. The stages of the innovative process according to the invention are described in detail below.

In particular, the friction material according to the method of the invention includes as its component materials: inorganic and/or organic and/or metallic fibers; a binder that is almost entirely or completely and exclusively constituted by a geopolymer or by a mix of geopolymers; at least one friction modifier or lubricant, e.g. including sulfurs and/or a carbonic material or nanomaterial; and at least one inorganic or metallic filler or abrasive.

However, the principal abrasive work of the friction material of the invention is done by the geopolymeric matrix of the pads generated by the binder.

Henceforth, "binder almost entirely constituted by a geopolymer" refers to a binder for friction elements in which geopolymer or a geopolymer compound constitutes at least 90% in weight of the total quantity of binder present.

The geopolymeric binder is, preferably but not necessarily, present in the compound of friction material according to the invention in a quantity equal to or greater than 5% in volume, or even more preferably greater than 20% in volume, calculated on the total volume of the compound. In fact, experiments have shown that with too small a quantity of inorganic binder, depending on the type of binder and the nature of the other materials used in the compound, the mechanical characteristics necessary for its use as a friction material cannot be achieved.

The friction material according to the method of the invention is therefore almost completely or totally lacking organic binders (which may be present at maximum in a quantity equal to or less than 10% in weight) and for this reason cannot be subject to heat degradation through oxidization at high temperatures, e.g., greater than 300° C., and up to beyond 600° C.

The geopolymeric binder produced according to the method of the invention and used in the friction material according to the invention as the single and principal binder and, therefore, prevalent (i.e., making up at least 90% of the total binder present), in the complete or near-complete absence of traditional organic binders, is obtained through a chemical reaction starting from inorganic precursors such as $SiO_2$ and $Al_2O_3$, and specifically using, according to an important aspect of the invention, commercial sodium (or potassium) silicate, for example from the company "PQ Corporation—Holland", possibly with the addition of a small quantity of sodium or potassium hydroxide (it also works in any case with a near-complete absence of hydroxide), and commercial metakaolin, for example, metakaolin obtained through the high-temperature calcining of kaolin from the company "Imerys Refractory Minerals—Argical-M 1200S", metakaolin containing approximately 55% $SiO_2$ and 39% $Al_2O_3$, plus $Fe_2O_3$, $TiO_2$, $K_2O$, $Na_2O$, Cao, and MgO impurities, which is generally assumed to have the following general chemical formula:

$$Al_2O_3 \cdot 2SiO_2$$

According to the invention, the inorganic geopolymeric binder is prepared partially in pre-mixed form and then joined to all the other component materials of the mix of friction material, preferably in a Loedige mixer or in any of the other mixers commonly used for friction materials, .e.g. Henschel or Eirich mixer.

The unfinished compound thus obtained then undergoes a molding process to produce the desired friction element, e.g., brake pads or blocks.

Synthesis of Geopolymeric Binder

According to the invention, the geopolymeric binder to be used in the friction compounds for braking elements are prepared differently from both hydrothermal synthesis and solution synthesis, described in EP3128201.

As indicated above and as described in detail in EP3128201, in the hydrothermal synthesis of EP3128201, commercial kaolin is dry mixed (in the form of powder) with caustic soda (sodium hydroxide) previously ground by commercial pellets and therefore powder form (possibly pre-hydrated with water with a 1:1 ratio and so still in powder form), and then the pre-mix powder obtained is mixed with the other components of the friction material compound; this final mix (complete compound, i.e., binder plus all other components) are directly molded into brake pads, or mixed with water, then oven-dried at high temperature, ground, and molded into brake pads. The geopolymerization reaction with production of hydrosodalite took place during the molding stage.

According to the variant of synthesis in solution, instead, we started with metakaolin which was made to react with an aqueous solution of soda or caustic potash. However, as indicated in EP3128201, this mix did not react, and therefore did not lead to the formation of geopolymer, unless sodium disilicate was added to the caustic solution. Moreover, this method led to the formation of an amorphous geopolymer, which could be converted into an at least partially-crystalline form only through further thermal treatment.

According to the invention, similar to the synthesis in solution method of EP3128201, a basic aqueous sodium silicate solution is first formed (e.g. by addition of caustic soda), dissolving any form of sodium silicate in water, with the possible addition of commercial soda pellets. Metakaolin is then added to this basic aqueous solution, all at once or gradually while mixing, or, vice versa, the basic soda and silicate solution is gradually added to the metakaolin powder, until a homogeneous paste is obtained with a higher $SiO_2/Al_2O_3$ ratio than the one obtained with the kaolin-soda geopolymerization technique reported in EP3128201, operating in the $SiO_2/Al_2O_3$ ratio range/interval between 3 and 10, i.e., with "x" being the molar ratio $SiO_2/Al_2O_3$, the valid ratio must be:

$$3 < x < 10$$

The key stage of this invention is now reached. This wet paste is taken from the mixer and undergoes, according to an important aspect of the invention, a process of forming and drying in any atmospheric regime (so also under vacuum) in any temperature regime up to 300° C., using an appropriate forming and drying system, e.g. tape casting, using specific material not sensitive to the basic atmosphere, suitable for neutral or alkaline pastes/mortars, e.g. Mylar or other types of materials suitable for neutral/alkaline pastes/mortars. During forming (in this case, it is also suitable to apply mechanical stress with high shear stress to the paste) and drying of the paste, the geopolymerization reaction occurs, in which the metakaolin is dissolved in the alkaline sodium silicate solution. The oligomers formed then condense together to create the 3D geopolymer network. At the end of the drying treatment, conducted at a temperature between 100 and 250° C., a dried aggregate residue is obtained, called amorphous geopolymer, with an initial variable loss of weight of 10 to 50% and with a residual moisture content of less than 30% in weight from the total weight of the silicate-metakaolin-soda "pre-mix".

This dried aggregate (therefore not a complete friction compound as in EP3128201), is ground and reduced to powder, using different grinding systems, preferably ball grinder or jar mill, until granulometry of less than 600 microns is obtained, preferably less than 400 microns: the final product is the geopolymer that constitutes the inorganic binder according to the invention, which presents in amorphous form, but especially as a powder with the positive aspect of not having free sodium hydroxide; this final product is then mixed with the other usual components of friction compounds, such as fillers, lubricants, abrasives, fibers, etc., obtaining a mixture of friction material that is molded as in EP3128201. During molding, simply due to the application of pressure and temperature, the previously-synthesized geopolymer particles consolidate and remain amorphous, resulting in a friction element, typically a brake pad, in which the component materials are dispersed into a matrix constituted solely by amorphous geopolymerized inorganic binder (except for possible limited quantities, less than 10%, of organic binder).

The friction elements thus obtained do not produce waste due to cracks or flaking, using pressure in the order of tens of MPa. The result is a reconsolidation of the powder under molding conditions comparable to EP3128201 and under the normal molding conditions of brake pads, producing braking performance comparable to those of the friction material produced according to the hydrothermal synthesis of EP3128201 and with the material and disc wear from use comparable to that of identical components created according to EP3128201.

Molding for Reconsolidation of Geopolymer Powder

The molding of the brake pads obtained with the method of the invention is done by placing the raw compound into a mold which also has a metallic support or backplate, property treated and with or without a known damping/insulating layer, called the "underlayer", which during the molding stage not only forms the layer or block of friction material, possibly over the underlayer when present, but also achieves adhesion of this layer or block to the metallic support.

The molding is done working at temperatures between 40 and 250° C. and at a pressure from 50 to 2000 Kg/cm2 for a time between 1 and 30 minutes, or performing the raw compound or mix into a mold and then molding the pre-formed compound on the backplate at a temperature of 40 to 250° C. at a pressure of 150 to 2000 kg/cm2 (14.7-49 MPa) for a period of 3 to 15 minutes.

Alternatively, the raw compound can be molded to obtain the friction material block, which is only then connected to the metallic support or backplate (with or without underlayer), for example using phenolic or silicon-based glue.

Other Components of the Friction Material

The components of the composition or raw compound of friction material to be produced according to the invention can be the components used in the friction materials already known in the technique, with the single precaution to completely replace the current organic binders with the inorganic binder obtained with the above method, simultaneously reducing the content of abrasives and increasing the content of lubricants.

The friction material obtainable according to the invention is also preferably free of copper and/or its binders, both in powder and fiber form.

In particular, the component made of fiber may consist of any organic or inorganic fiber other than asbestos, or in any metallic fiber commonly used in friction materials, preferably excluding copper and its binders. Illustrative examples include inorganic fibers such as glass fibers, wool or rock fiber, wollastonite, sepiolite and attapulgite, and organic fibers such as aramid fibers, polyimide fibers, polyamide fibers, phenolic fibers, cellulose and acrylic fibers or PAN (Polyacrylonitrile), metallic fibers such as steel fibers, stainless steel, aluminum fibers, zinc, etc.

Fibers may be used in the form of short fibers or powder.

The quantity of fiber is preferable between 2% in volume and 30% in volume out of the total volume of friction material and more preferably between 8% and 15% in volume and the fibrous component preferably always includes rock fiber, which has been shown to have a strong affinity with the geopolymers used as binder.

Numerous materials known in the technique can be used as organic or inorganic fillers. Illustrative examples include precipitated calcium carbonate, barium sulphate, magnesium oxide, calcium hydroxide, calcium fluoride, slaked lime, talc, mica.

These can be used alone or in combinations of two or more. The quantities of these fillers is preferably between 2% to 40% in volume based on the total composition of the friction material.

The friction modifier (which could include all or part of the filler) can include, in addition to carbonic materials or nanomaterials such as graphene, an organic filler such as cashew dust, rubber dust, powdered tread rubber, a variety of unvulcanized rubber particles, a variety of vulcanized rubber particles, an inorganic filler such as barium sulphate, calcium carbonate, calcium hydroxide, vermiculite and/or mica, an abrasive such as silicon carbide, alumina, zirconium silicate, metal sulfide-based lubricant such as molybdenum disulphide, tin sulfide, zinc sulfide, iron and non-ferrous sulfides, metal particles other than copper and copper alloys, and/or a combination of the above.

Abrasives can be classified as follows (the list below is only indicative, not necessarily exhaustive and not limiting):
  Mild Abrasives (Mohs 1-3): talc, calcium hydroxide, potassium titanate, mica, kaolin, vermiculite;
  Medium Abrasives (Mohs 4-6): barium sulphate, magnesium oxide, calcium fluoride, calcium carbonate, wollastonite, calcium silicate, iron oxide, silica, chromite, zinc oxide;
  Strong Abrasives (Mohs 7-9): silicon carbide, zircon sand (zirconium oxide), zirconium silicate, zirconium, corundum, alumina, mullite.

Preferably, but not necessarily, the friction material obtainable according to the invention does not contain strong abrasives but only medium or mild abrasives, since the geopolymer produced as binder is itself already a medium abrasive.

The friction material produced according to the invention also preferably includes graphite, in a quantity between 5% and 15% in volume based on the total composition of the friction material.

The total content of lubricants, according to desired friction characteristics, is preferably between 4% and 20% of the entire volume of friction material, and can include graphene in particular.

Curing and Painting

The molded article item (brake pad), which was cured during pressing and generally already usable after this simple press molding, is optionally, when required by the formulation and/or by the design specifications, further post-cured through supplementary heat treatment from 80 to 450° C. for between 10 minutes and 15 hours, then spray- or powder-painted, oven-dried and possibly mechanically processed where necessary to produce the finished product.

The friction material obtained with the method of the invention, both after simple press molding and after possible optional supplementary heat treatment, can be used in applications such as disc brake pads, shoes, and linings for cars, trucks, train cars and various other types of vehicles and industrial machines, or in clutch discs.

BRIEF DESCRIPTION OF DRAWINGS

This invention will now be described in more detail with reference to non-exhaustive practical examples of implementation and with reference to FIGS. 1 to 6 of the attached drawings, in which.

DETAILED DESCRIPTION

Figure 1:
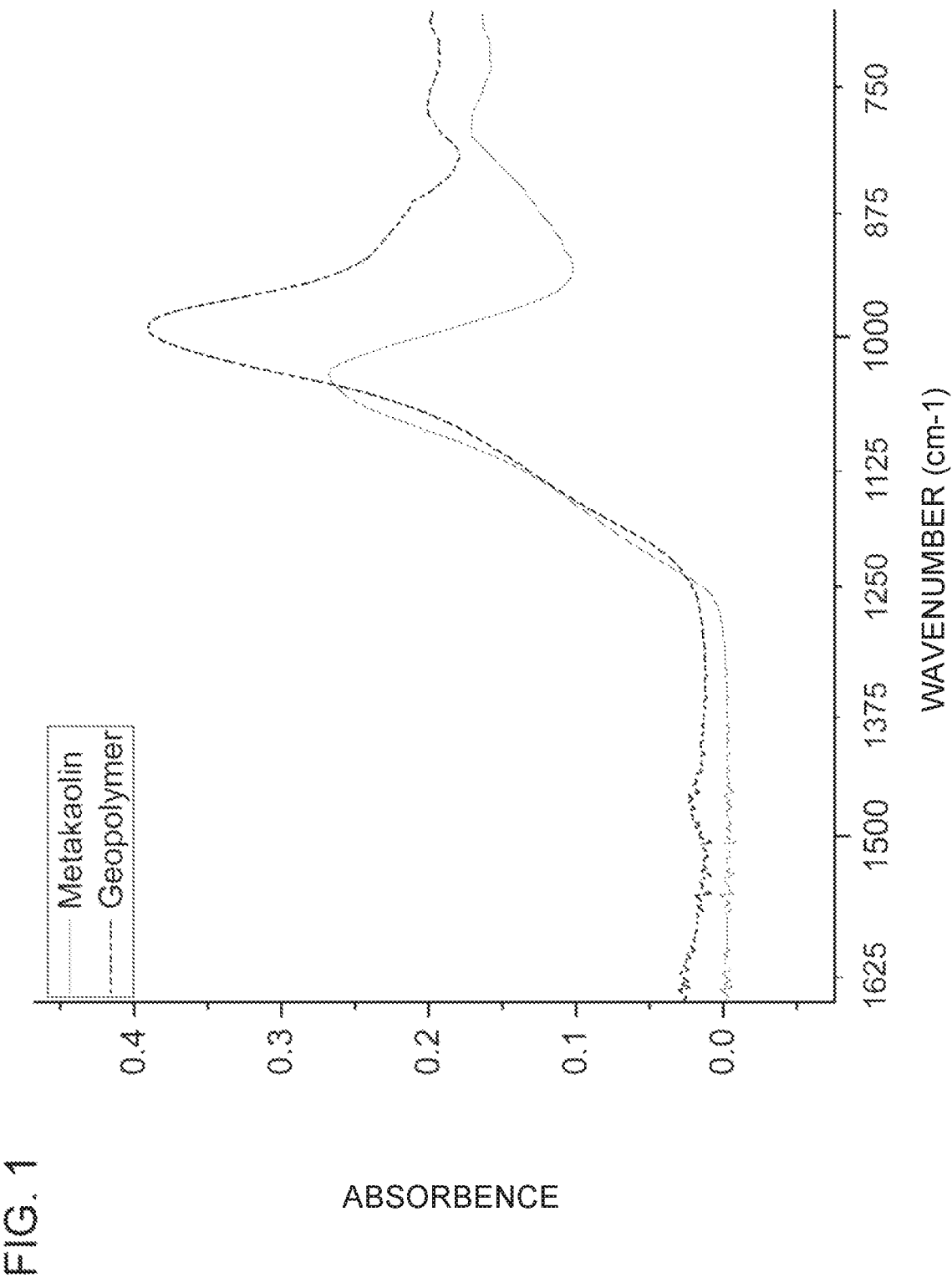
FIG. 1 schematically illustrates the result of Fourier-transform infrared spectroscopy (FTIR) according to an analysis carried out respectively on metakaolin and geopolymer after formation, heat treatment, and grinding.

The examples and comparative examples are reported herein for purposes of illustration, and are not intended to limit the invention.

Prior Art—Comparative Example

Operating as described in EP3128201, sodium hydroxide is ground in a hammer mill, in air. Then sodium hydroxide and kaolin are mixed in dry powder conditions using a known mixer, for example Loedige or Eirich, to obtain a raw binder (not yet polymerized), with a weight ratio of 78:22 between Kaolin and caustic soda, NaOH.

The binder thus produced is added to other raw materials required by the friction material mix or composition selected, using a known mixer, for example Loedige or Eirich.

The mix or composition of "green" friction material thus obtained is then hot molded, under pressure, to obtain a first series of brake pads.

Method According to the Invention—Operational Example

Prepare a solution of sodium silicate and NaOH in water ($H_2O$) between 1 and 6% in weight of NaOH by dissolving commercial soda pellets directly in water, bringing the solution to pH 14.

This alkaline solution and commercial metakaolin are mixed with a solution/metakaolin weight ratio between 1 and 10 (inclusive) for a Si/Al molar ratio in the range $1<x<10$ [sic]; preferably this range can vary from 2 to 6. Different ratios with a higher Al or Si content are also possible; however, the experimental results and theoretical calculations lead to the conclusion that the invention operates with maximum efficiency with a Si/Al ratio between 2 and 6.

The silicate solution and caustic soda and metakaolin solution are mixed through mechanical agitation, to obtain the formation of a homogeneous paste.

The paste thus obtained is spread onto a plastic mat using the "Tape Casting" technique and dried in temperatures between 70-250° C. and under atmospheric pressure, in a time ranging between 10' (minutes) and 90' (minutes), to reduce the weight of the mixture by up to 10-40% of the original weight, and transform it into pure amorphous geopolymer.

The dried silicate-soda-metakaolin geopolymeric system is removed from the drier and ground with a ball grinder. Its final water content must be less than 35% in weight. This content is calculated by considering the maximum quantity of water that the system is able to lose, to which corresponds a powder moisture of 0%. Losses of weight less than this value will lead to a water content equal to the ratio between residual water and post-drying weight.

The binder thus produced is in powder form and is added to other raw materials required by the friction material mix or composition selected for dry mixing, using a known mixer, for example Loedige or Eirich.

The mix or composition of "green" friction material thus obtained is then hot molded, under pressure, to obtain a second series of brake pads.

Molding

The molding stage according to both methods described above is done by placing the raw or "green" compound and possibly a metallic support with a possible underlayer into a mold (mold and the cited components of a brake pad are known and not illustrated for simplicity) which is heated to a temperature between 60 and 250° C., submitting the raw compound to a molding pressure between 150 and 2000 Kg/cm2 for a time between 1 and 15 minutes, or pre-forming the raw compound 11 [sic] in a mold and then molding the pre-formed compound onto the metallic support, working at a temperature between 100 and 250° C. and with a molding pressure between 150 and 2000 kg/cm2 for a period between 1 to 15 minutes.

Alternatively, the raw compound can be molded without a metallic support, so as to obtain only a block of friction material, which is then subsequently glued in a known manner to the metallic support, whether or not it has an insulator/dampener layer (known) or underlayer, using phenol- or silicon-based glues, e.g., pressing the block of friction material against the metallic support with the possible underlayer, operating at a temperature of 180° C. for 30 seconds.

In any case, the molding pressure must always be greater than the water saturation pressure at the molding temperature.

At the end of both of the processes described above, an asbestos-free friction material is thus obtained, including as component materials inorganic and/or organic and/or metallic fibers, at least one binder, at least one friction modifier or lubricant, and at least one filler or abrasive, where the binder is constituted at least 90% by a silica-aluminum geopolymer.

The component materials of the raw compound are added to the inorganic binder in appropriate quantities such that the total quantity of inorganic geopolymeric binder is preferably but not necessarily equal to or greater than 10% in volume and preferably greater than 25% in volume of the entire volume of friction material.

Furthermore, compared to what is reported in EP3128201, because metakaolin was, according to the invention, dissolved in an aqueous solution of sodium and soda, the inorganic geopolymeric binder of the friction material obtained presents a completely amorphous structure, which remains amorphous even after molding due to the consolidation of the geopolymer powder.

In the method according to the invention, after obtaining the binder, but before the curing stage (which normally coincides with the molding stage) the friction material compound, whether asbestos or derivatives, or copper or its binders, are not added as component materials; therefore the friction material obtained according to the invention is substantially free of or nearly free of organic binders, is substantially free of copper or its binders and/or fibers of copper or its binders and, preferably but not necessarily, is substantially free of strong abrasives, where, here and henceforth, the term "substantially free of" means that the materials indicated may at most be present as impurities; at least one abrasive contained in the friction materials according to the invention is therefore, preferably but not necessarily, a medium or mild abrasive; where such terms refer to the following classification, already indicated above:
  Mild Abrasives (with hardness of Mohs 1-3): e.g. talc, calcium hydroxide, potassium titanate, mica, vermiculite, kaolin;
  Medium Abrasives (with hardness of Mohs 4-6): e.g. barium sulphate, magnesium oxide, calcium fluoride, calcium carbonate, wollastonite, calcium silicate, iron oxide, silica, chromite, zinc oxide;
  Strong Abrasives (with hardness of Mohs 7-9): e.g. silicon carbide, zircon sand (zirconium oxide), zirconium silicate, zirconium, corundum, alumina, mullite.

According to another aspect of the invention, finally, the ratio in volume between the lubricants and the abrasives contained in the friction material to be formed is preferably selected between 1:1 and 1:4 (for comparison, this ratio is generally 1:8 or more in known friction materials with organic binder).

Furthermore, the starting raw materials for obtaining geopolymeric binder are selected such that the inorganic geopolymeric binder in the friction material according to the invention has a $SiO_2/Al_2O_3$ ratio between 3 and 10 and an $SiO_2/Na_2O$ ratio between 3 and 10.

More generally, the inorganic geopolymeric binder is obtained according to the invention, and unlike EP3128201, prior to molding of the desired friction material. The molding of the block of friction material takes place at a temperature T between 80° C. and 500° C. and preferably between 110° C. and 250° C., under pressure P plus the saturation pressure (vapor tension) of the water at molding temperature, so as to have water in liquid state.

The densification of the geopolymer powder is obtained during molding.

Example 1—Comparison Between Methods of Binder Synthesis 115.7 gr metakaolin from the company "Imerys Refractory Minerals" are mixed with 300.0 gr of aqueous solution of 139.4 g sodium silicate (as already indicated, potassium silicate would also work) in any form, in this case from the company "PQ Corporation—Holland" and 1.51 g caustic soda in pellets, previously prepared, over a time varying from 5' to 45', at a speed of 800 rpm, using a drill agitator along with a specific mixing whisk for medium-high viscosity fluids. The wet paste obtained from mixing the metakaolin with the sodium silicate—caustic soda solution is spread and dried using a sheet of Mylar, specific for wet and alkaline pastes/mortars using the following parameters: thickness of spread paste between 0.1 and 3 mm, drying temperature between 400 and 250° C., sheet sizes between A3 and A4, drying time variable between 10' and 90'.

The dried binder in solid aggregate form is then detached from the sheets and ground with a ball grinder rotating at 275 turns/min, for 14 hours, to bring the granulation of the product to at least 150 microns.

The final product is a powder ready to be used as a binder.

The granular characteristics of the powdered binder thus produced are shown in the following TABLE 1.

TABLE 1

| Sample | d10 | d50 | d90 |
|---|---|---|---|
| #24-1 | 8 | 66 | 295 |

As can be seen, the ground product has a granulometry between 300 microns and 7.0 microns, with at least 50% of the product having a granulometry of approximately 50-70 microns.

The powder obtained is thus characterized.

Fourier-transform infrared spectroscopy on the metakaolin and the geopolymeric powder created produces the graphic under FIG. 1. We can observe that the peak of 1038 $cm^{-1}$ for the Si—O binder in metakaolin undergoes a shift to 988 $cm^{-1}$ for the reacted geopolymer after drying.

This shift is an indicator of the fact that the aluminum contained in metakaolin, thanks to the presence of sodium, has assumed coordination 4 and has therefore entered into the three-dimensional reticulum of the silica, therefore resulting in the formation of a stable geopolymer.

Figure 2:
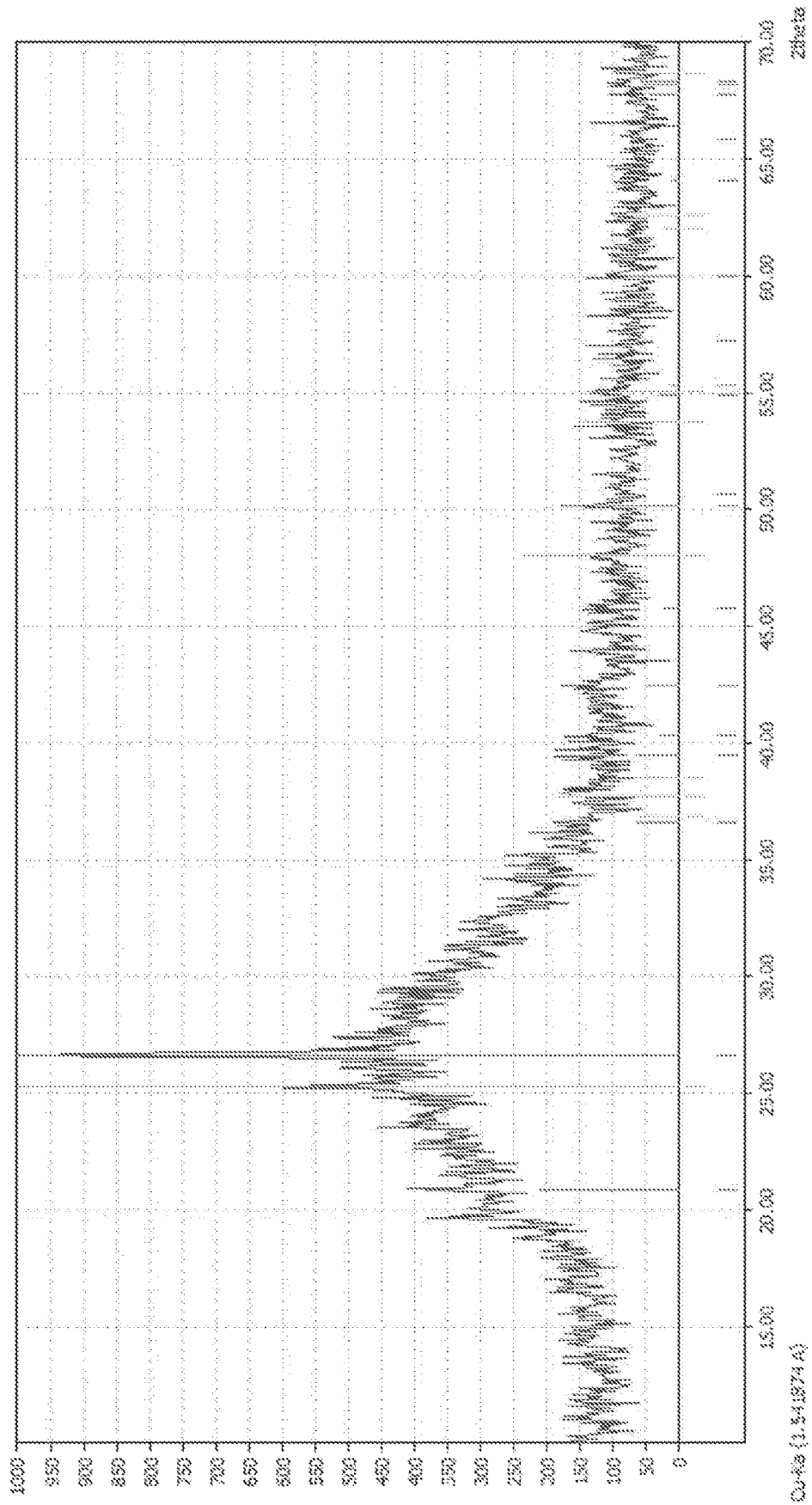
FIG. 2 illustrates the X-ray diffractometric spectrum of powdered sample of a powdered sample pure geopolymeric binder obtained according to the method described by this invention.

An X-ray diffractometric spectra analysis produces the graphic in FIG. 2. This shows that the geopolymer possesses an amorphous structure, as is logical to expect from the reaction mechanism described for obtaining this type of geopolymer.

Example 2—Production of Brake Pads

Two identical friction material formulations were prepared, using for each component the average value of the intervals reported in table 2, below, and using as binder the powders obtained through example 1, indicated as "binder mix".

TABLE 2

| Geopolymeric | Mix Materials % Vol |
|---|---|
| Fibers | 8-25 |
| Friction Powders | 0.5-3 |
| Carbon | 8-20 |
| Rubbers | 1-4 |
| Medium Abrasive | 5-15 |
| Mild Abrasive | 9-12 |
| Sulphurs | 3-10 |
| Inorganic Binder Mix | 20-60 |
| TOTAL | 100 |

The binder mix is added to the other ingredients of the mix according to a general scheme: binder 20-60% in weight other components 40-80% in weight; the mix is done with a Loedige mixer.

Subsequently, with the two mixes obtained, identical in quantity and components, except for the fact of using the binder according to EP3128201 and according to this invention, we proceed to molding of the two series of identical brake pads, placing the raw or "green" compound and a metallic support into one mold. Molding takes place by steps at temperatures of 100-150/70-135/70-135° C., subjecting the raw compound to a molding pressure of 250-720 Kg/cm2 for a time of 2-15 minutes.

The friction material thus obtained is analyzed for characterization.

The first characterization done is the X-ray diffractometric spectra analysis. This, however, requires an important clarification. As has already been pointed out, the geopolymer powder obtained according to this invention presents an amorphous structure, and it is therefore difficult to evaluate the amorphous analysis of the friction material system after molding. This is because an amorphous material gives a much lower signal response than a crystalline material and not characterized by the presence of well-defined diffraction peaks.

Furthermore, with the presence of graphite, which has an extremely high response in terms of signal quality for XRD analysis, the amorphous material is difficult to distinguish from the baseline of the XRD graphic. For this reason, only the binder is molded according to the same methods shown above, and therefore the XRD analyses shown in the figure were conducted on only the matrix after molding. Measurement of the brake pad system is actually not possible. However, it seems obvious to conclude that there is no difference between the pure geopolymeric matrix, obtained according to this invention, molded alone and the same matrix molded inside of the brake pad.

Figure 3:
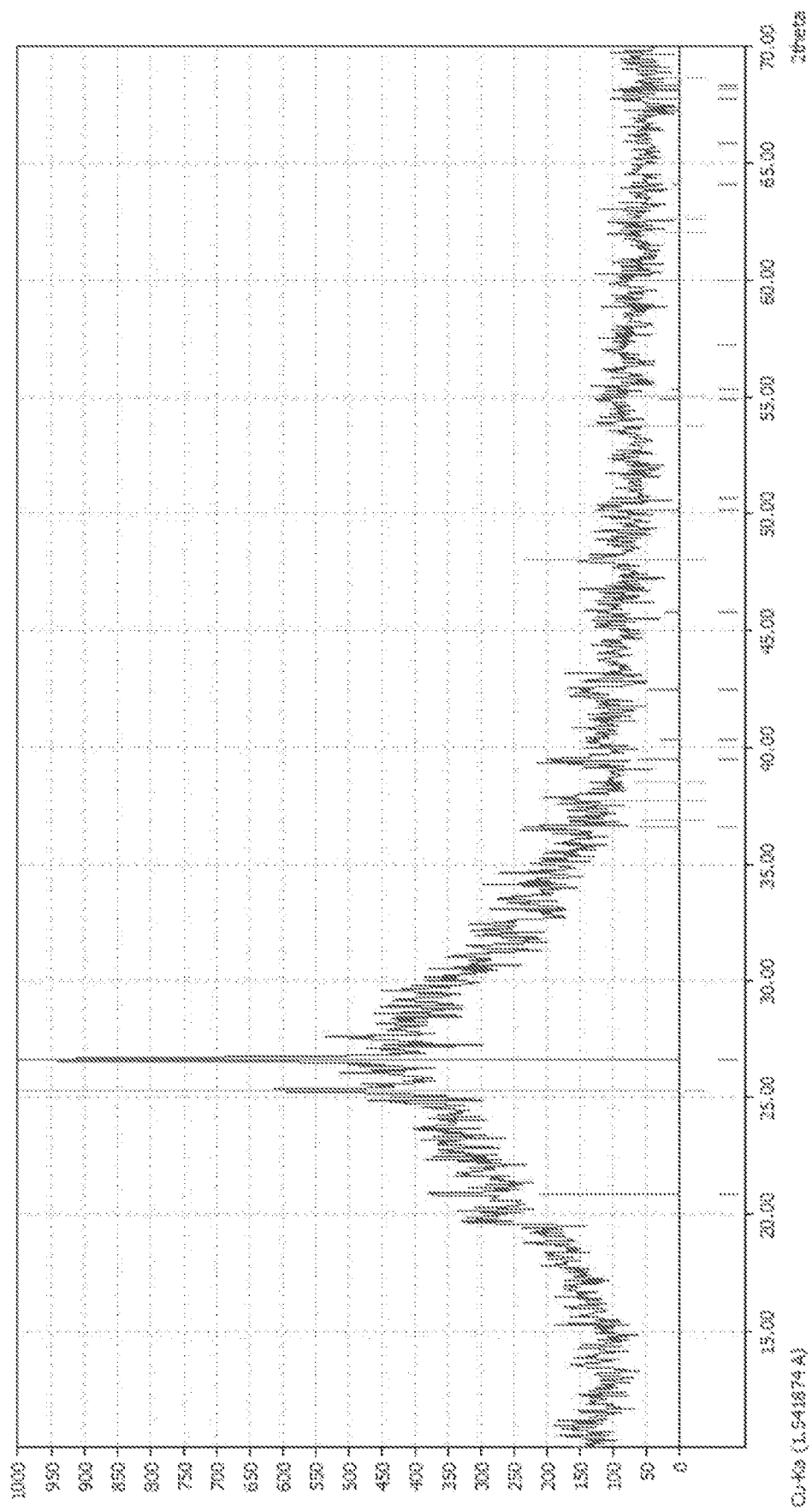
FIGS. 3 and 4 illustrate the X-ray diffractometric spectra of inorganic binder samples after molding of the binder only, respectively according to the method of invention and according to the kaolin-soda system of EP3128201.

An X-ray diffractometric spectra analysis of the friction material with the binder produced by dissolving soda and silicate in an aqueous solution, mixing with metakaolin in powder, and then drying (hereinafter "wet mixing method") produces the graphic in FIG. 3 after hot molding of the geopolymeric powder obtained, causing its consolidation.

Figure 4:
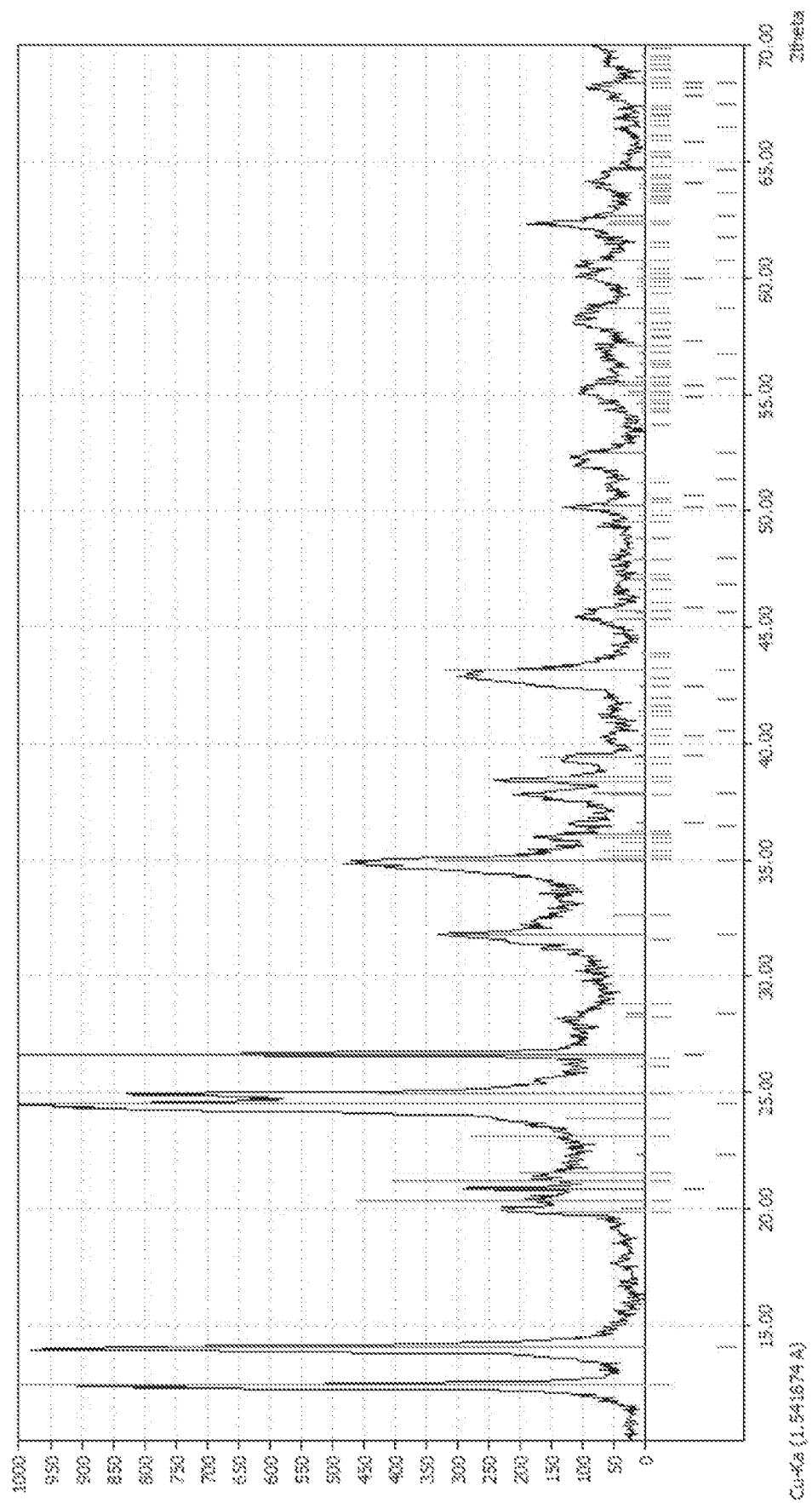

An X-ray diffractometric spectra analysis of the friction material created with the binder according to EP31228201 produces the graphic in FIG. 4 after hot molding of the related binder.

As can be seen, in this invention the structure remains amorphous even after molding, since it started from an already-reacted geopolymer, giving rise only to reconsolidation of the powder into a solid block, while for EP31228201, since it is molded with consequent geopolymerization reaction of the binder, hydrosodalite forms.

Essentially, it is clear that the capacity of the invention's geopolymeric binder to maintain its amorphous structure even after the consolidation stage permits a clean distinction from what can be obtained through hydrothermal synthesis according to prior art.

Example 3—Braking Tests

The two batches of brake pads produced as described were subjected to the following tests:
Efficiency Test according to AKM including: settlement braking, braking at different fluid pressures, cold (<50° C.) assessment braking, simulated highway braking, two high-energy braking (first FADE test) series interspersed with a regenerative braking series. From this test it is also possible to extrapolate, using methods known to industry technicians, the wear to which the brake pad and disc are subjected.

Figure 5:
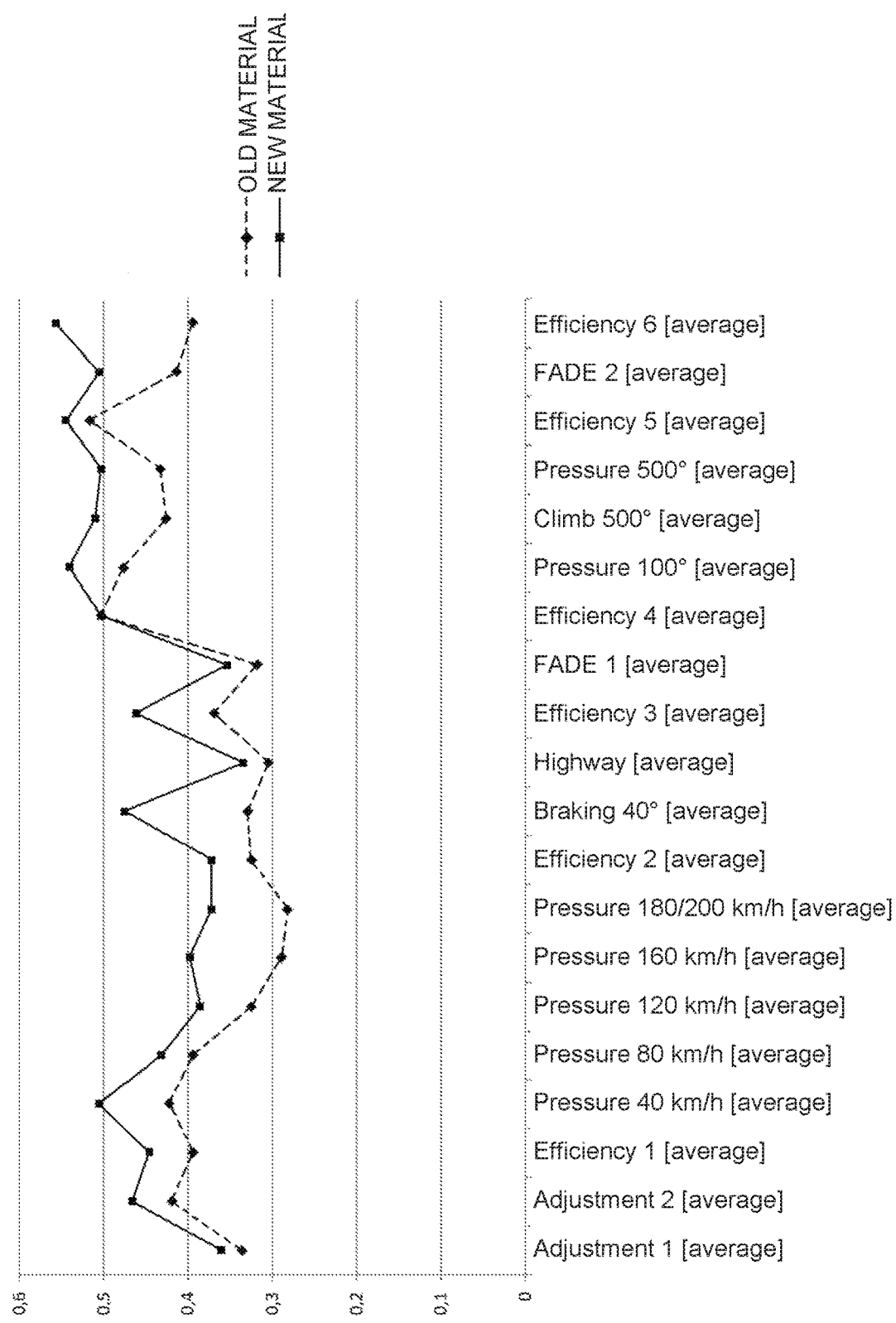
FIG. 5 illustrates the results in simplified graphic form of comparative braking efficiency tests according to AKM standard of the same brake pads produced with a prior art formulation of friction material (dotted line) and a friction material formulation that is identical, but produced according to the invention (continuous line)

The results obtained are illustrated in FIG. 5, which schematically represents an extract of the significant data of the experimental curves obtained. The dotted graphic in FIG. 5 refers to the brake pads with binder produced using the "dry" method according to EP3128201, while the line graphic continues to refer to brake pads produced with binder obtained using the "wet" method plus drying, according to the invention. As can be seen, the experimental results are completely comparable, and in any case better, for the material produced according to the invention.

Figure 6B:
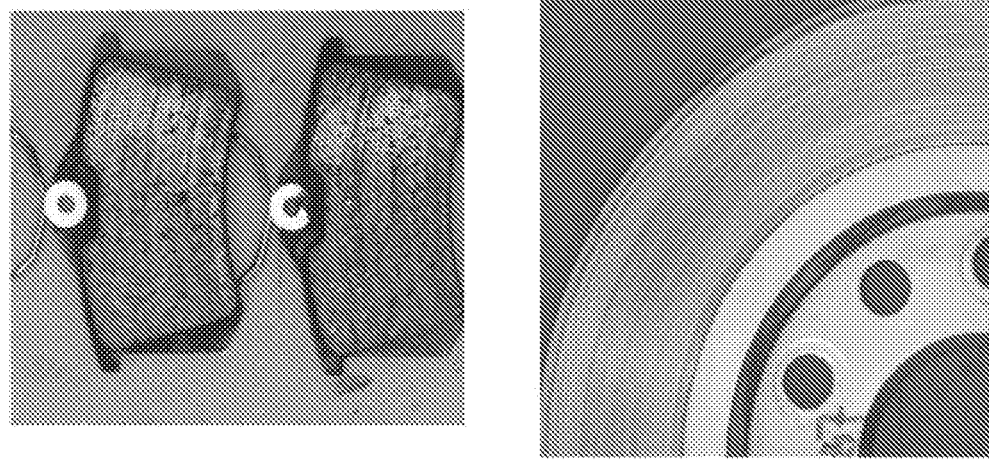
FIG. 6 illustrates a series of photographs of brake pads and respective brake discs at the end of the braking efficiency tests according to AKM standard produced with an identical friction material formulation, but using respectively the prior art method (FIG. 6a) and the method of the invention (FIG. 6b).
Figure 6A:
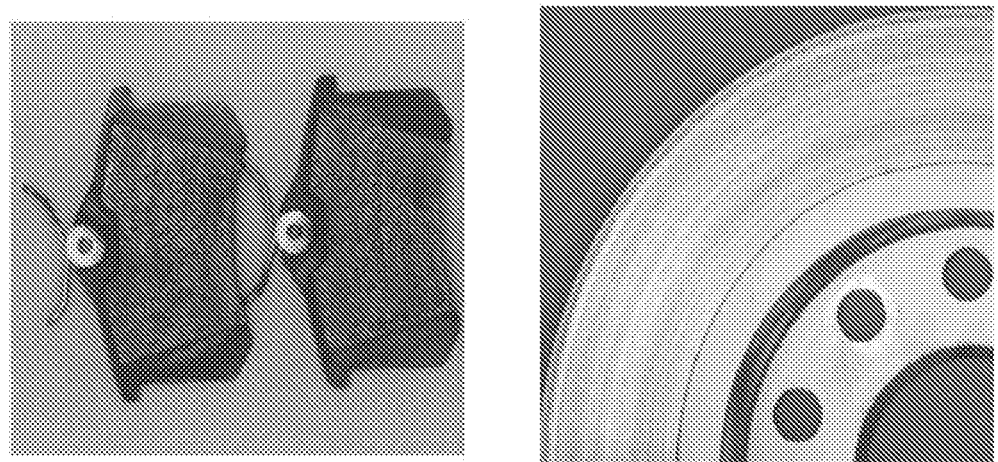

At the end of the braking test, the brake pads and discs are dismounted, examined, and photographed and the results reported in FIG. 6 and its table 3, which shows the wear calculated both on the brake pads and brake discs.

TABLE 3

| | Int. pad wear [g] | Est. brake wear [g] | Disc wear [g] | Disc lines | Material on disc |
|---|---|---|---|---|---|
| Dry Comparison Method | 15.7 | 17.00 | 6.3 | YES | YES |
| Wet Invention Method | 15.3 | 16.6 | 6.1 | NO | NO |

As can be seen, the brake pads produced according to the invention show very similar pad and disc wear, not significantly different. However, it can be seen that the brake disc is neither stained or marked by the pads with geopolymeric binder obtained using the procedure of this invention.

From what has been described, the advantages of the method described in this patent are clear.
There is no need to work with free or volatile caustic soda powder, with all the consequent safety problems;
The final dried product is not aggressive, since it has a geopolymer powder that is already reacted and much less alkaline than the starting reagents;
There is better control of final moisture.
The product thus obtained is much less hygroscopic than the kaolin-soda based-system; this allows a powder that is much more air-stable, and therefore does not present the already-described molding problems connected to moisture absorption.
The purposes of the discovery are therefore fully achieved.

The invention claimed is:

1. A method for creating a block or layer of friction material without asbestos and insensitive to heat degradation in use, the method comprising:
   obtaining a basic aqueous solution, at a pre-fixed pH, of an alkaline silicate and a hydroxide in water through dissolving, in water, an alkaline silicate powder of sodium or potassium;
   mixing the aqueous solution of hydroxide and alkaline silicate with a material selected from a group consisting of metakaolin, kaolin, fly ash, and mixtures of thereof until a wet paste is obtained;
   forming and drying the wet paste until a dried geopolymer aggregate is obtained, wherein a final moisture content of the dried geopolymer aggregate is less than 30% in weight calculated on the total weight of the geopolymer binder after drying;
   grinding the dried geopolymer aggregate to a powder;
   mixing the ground dried aggregate as an inorganic binder with inorganic and/or organic and/or metallic fibers, at least one friction modifier or lubricant, and at least one filler or abrasive into a friction material compound to obtain a raw frictional material compound having as binder the ground dried geopolymeric aggregate; and
   hot molding between about 40° C. and about 300° ° C. the raw frictional material compound under pressure greater than a water saturation pressure at the molding temperature to obtain a block of friction material having at least 90% geopolymer as binder.

2. The method according to claim 1, wherein obtaining the basic aqueous solution further comprises:
   dissolving in the basic sodium or potassium hydroxide solution a generic source of silica.

3. The method according to claim 2, wherein the generic source of silica comprises quartz or colloidal silica.

4. The method according to claim 3, forming and drying the wet paste is performed to obtain a weight of the final product between 5 and 50% of the original weight, which corresponds to a final moisture content of less than 30%.

5. The method according to claim 1, wherein obtaining the basic aqueous solution is performed to obtain the alkaline solution of sodium silicate in water with a pH between 12 and 14.

6. The method according to claim 1, wherein mixing the aqueous solution is performed to obtain a percentage in weight of soda or potash between 0 and 10%, and wherein the caustic hydroxide/alkaline silicate solution and metakaolin, kaolin or fly ash are mixed by mechanical agitation to obtain a formation of a homogeneous viscous paste containing no agglomerates of metakaolin, kaolin or fly ash not adequately dispersed in the solution.

7. The method according to claim 1, wherein grinding the dried geopolymer aggregate is performed with a temperature between 20° to 300° C. and normally under atmospheric pressure, conditioning up to a vacuum state.

8. The method according to claim 1, wherein grinding the dried geopolymer aggregate is preferably performed by a ball mill to obtain a product consisting of a dried geopolymer aggregate ground into powder, with a granulometry below 800 microns.

9. A method for obtaining an inorganic binder for friction material without asbestos and insensitive to heat degradation during use, the method comprising:
   obtaining a basic aqueous solution, at a pre-fixed pH, of an alkaline silicate and a hydroxide in water through dissolving, in water, an alkaline silicate powder of sodium or potassium;
   mixing the aqueous solution of hydroxide and alkaline silicate with a material selected from a group consisting of metakaolin, kaolin, fly ash, and mixtures of thereof until a wet paste is obtained;
   forming and drying the wet paste under atmospheric pressure until a dried geopolymer aggregate is synthesized, wherein a final moisture content of the dried geopolymer aggregate is less than 30% in weight calculated on the total weight of the geopolymer binder after drying; and
   grinding the dried geopolymer aggregate to a powder, wherein the ground dried geopolymer aggregate constitutes the inorganic binder.

10. The method according to claim 9, wherein the material mixed with the aqueous solution of hydroxide and alkaline silicate is powder metakaolin.

11. The method according to claim 9, wherein obtaining the basic aqueous solution further comprises:
    dissolving in the basic sodium or potassium hydroxide solution a generic source of silica.

12. The method according to claim 11, wherein the generic source of silica comprises quartz or colloidal silica.

13. An inorganic binder for friction materials without asbestos and insensitive to heat degradation during use, the inorganic binder comprising:
    a hydroxide and an alkaline silicate dissolved, in water, an alkaline silicate powder of sodium or potassium and mixed with a material selected from a group consisting of metakaolin, kaolin, fly ash, and mixtures of thereof until a wet paste is obtained, wherein the wet paste is formed and dried under atmospheric pressure until a dried geopolymer aggregate is synthesized and ground into a powder, wherein the inorganic binder has:
    a moisture content less than 30% in weight;
    an Si/Al molar ratio between 1.5-6;
    a granulometry of less than 800 microns;
    an alkaline hydroxide content in the mixing stage between 0 and 10%;
    a FTIR spectrum with peak associated with a symmetrical vibration of the Si—O bond which moves from its initial position of 1038 $cm^{-1}$ for metakaolin to a value of less than 1000 $cm^{-1}$ for the geopolymer obtained after the mixing stages with the silicate and alkaline hydroxide solution and drying;
    an amorphous structure after the synthesis stage;
    the ability to reconsolidate if exposed to pressure and temperature between 150 and 2000 $kg/cm^2$ and 100-250° C.; and
    a reconsolidation mechanism of the geopolymer powder for temperature and pressure conditions similar to those normally used in the production of brake pads; and
    wherein the inorganic binder maintains its amorphous structure after the consolidation stage.

14. A brake pad with a block of non-asbestos friction material comprising:
    inorganic and/or organic and/or metallic fibers;
    at least one filler or abrasive;
    at least one friction modifier or lubricant; and
    at least one binder, wherein the at least one binder is almost completely or completely and exclusively inorganic,
    made up at least 90% of an amorphous geopolymer or a mixture of amorphous geopolymers, and
    obtained through
    obtaining a basic aqueous solution, at a pre-fixed pH, of an alkaline silicate and a hydroxide in water through dissolving, in water, an alkaline silicate powder of sodium or potassium;

mixing the aqueous solution of hydroxide and alkaline silicate with a material selected from a group consisting of metakaolin, kaolin, fly ash, and mixtures of thereof until a wet paste is obtained;

forming and drying the wet paste until a dried geopolymer aggregate is obtained, wherein a final moisture content of the wet paste is less than 30% in weight calculated on the total weight of the geopolymer binder after drying;

grinding the dried geopolymer aggregate to a powder;

mixing the ground dried aggregate as an inorganic binder with inorganic and/or organic and/or metallic fibers, at least one friction modifier or lubricant, and at least one filler or abrasive into a friction material compound to obtain a raw frictional material compound having as binder the ground dried geopolymeric aggregate; and hot molding between about 40° C. and about 300° ° C. the raw frictional material compound under pressure greater than a water saturation pressure at the molding temperature to obtain a block of friction material having at least 90% geopolymer as binder.

\* \* \* \* \*